US005529207A

United States Patent [19]

Oden et al.

[11] Patent Number: 5,529,207

[45] Date of Patent: Jun. 25, 1996

[54] ADJUSTABLE RETAINER SYSTEM FOR VENDING MACHINE STORAGE COMPARTMENTS

[75] Inventors: Kenneth W. Oden, Charles Town, W. Va.; Thomas E. Uzzle, St. Louis, Mo.

[73] Assignee: Royal Vendors, Inc., Kearneysville, W. Va.

[21] Appl. No.: 377,694

[22] Filed: Jan. 25, 1995

[51] Int. Cl.[6] .......... B65G 59/00

[52] U.S. Cl. .......... 221/67; 312/45

[58] Field of Search .......... 221/67, 197, 241; 211/59.1, 59.2; 312/42, 45

[56] References Cited

U.S. PATENT DOCUMENTS

| | | | |
|---|---|---|---|
| 2,836,326 | 5/1958 | Childers | 221/67 |
| 3,026,002 | 3/1962 | Tornes | 221/67 |
| 4,460,107 | 7/1984 | Lindsey | 221/67 |
| 4,940,161 | 7/1990 | Hieb | 221/67 |
| 4,986,615 | 1/1991 | Hieb et al. | 312/45 |
| 4,991,739 | 2/1991 | Levasseur | 221/114 |
| 4,991,740 | 2/1991 | Levasseur | 221/114 |

*Primary Examiner*—Kenneth Noland

*Attorney, Agent, or Firm*—Cohn, Powell & Hind

[57] ABSTRACT

This retainer system for vending machine storage compartments includes opposed compartment walls and opposed elongate retainers selectively connected to associated compartment walls in adjustable relation lengthwise of the containers to engage selected contoured containers intermediate the length thereof to provide a stop inhibiting axial movement of said selected containers.

14 Claims, 5 Drawing Sheets

ADJUSTABLE RETAINER SYSTEM FOR VENDING MACHINE STORAGE COMPARTMENTS

BACKGROUND OF THE INVENTION

This invention relates generally to vending machine storage compartments and particularly to an adjustable retainer system by which a compartment may be adapted to store containers of different sizes.

Vending machines are well known which dispense articles, such as cans, from storage compartments. U.S. Pat. Nos. 4,991,739 and 4,991,740, for example, disclose vending machines for dispensing cans from compartments having a turnstile type support below each compartment which dispenses cans of a particular size, the compartments being suitable for storing a depth of one or more cans. The turnstile support is activated by a reciprocating release mechanism and works well for its intended purpose.

Beverage manufacturers increasingly are producing beverages in various sizes of containers in addition to the common 12 ounce (355 ml.) can. While it is not difficult to produce vending machines having compartments which dispense containers of a particular size, there is a need for a vending machine having compartments which can be converted readily from dispensing cans of one size to cans of another size, for example, from compartments dispensing 12 ounce (355 ml.) cans to those which will dispense cans or bottles of other sizes such as 20 ounce (592 ml.). The problem, of course, is that the larger volume containers have a greater diameter, or greater length or both, which cannot readily be dispensed from the same exit passage size.

In addition, retainers which are currently employed to hold the containers in place against axial movement accomplish the retention function by the use of return flanges on the compartment wall, added guard members or moveable gates, which are engageable with the container ends. This type of retainer intrudes into the compartment and obstructs access not only to the front compartment but also to the rear compartment where multiple compartments are used.

The adjustable retainer system solves these and other problems in a manner not revealed in the known prior art.

SUMMARY OF THE INVENTION

This retainer system facilitates the use of the same basic storage compartment for various sizes of container and provides adjustable positioning and engagement of the retainers with the containers so that they can engage the containers at points intermediate the ends rather than only at the ends. Because of this arrangement, the retainers open up the front loading width and considerably facilitate loading. Moreover, loading is additionally facilitated in rear compartments where multiple compartments are used.

The retainer system also provides that increased storage capacity is available because the front loading capability permits the front compartments to be taken to full height resulting in capacity increase of up to 30% or more. Furthermore, once the retainers are positioned for a particular container length they need not be moved while the same product is dispensed. Thus, the task of the route person loading the containers is simplified. The cost savings are considerable because the more complicated fixed end retainers are eliminated.

This retainer system for a vending machine storage compartment for containers having a longitudinal axis and variable length and diameter comprises a first compartment wall having connection means; a second compartment wall oppositely disposed of said first compartment wall and having connection means; a first elongate retainer having connection means engageable with the connection means of the first compartment wall for removably connecting the first retainer to the first compartment wall in selectively adjustable relation lengthwise of the container; and a second elongate retainer having connection means engageable with the connection means of the second compartment wall for removably connecting the second retainer to the second compartment wall in selectively adjustable relation lengthwise of the container; the containers being engageable by the retainers to inhibit axial movement and the access width between the retainers being sufficiently great to facilitate loading.

It is an aspect of this invention to provide that the first compartment wall connection means includes upper and lower rows of slot means; the second compartment wall connection means includes upper and lower rows of slots means; the first elongate retainer connection means includes upper and lower hook means selectively engageable with associated upper and lower slot means; and the second elongate retainer connection means includes upper and lower hook means selectively engageable with associated upper and lower slot means.

It is another aspect of this invention that the first compartment wall includes a lower tapered portion; and the first elongate retainer includes a lower portion conforming generally to the lower tapered portion of the first compartment wall.

It is yet another aspect of this invention that the second compartment wall is generally vertical; and the second elongate retainer is generally vertical.

It is yet another aspect of this invention to provide that the first elongate retainer includes an outstanding flange formed into upper and lower hooks providing the connection means.

It is another aspect of this invention to provide that the first compartment wall includes a lower tapered portion, and the first elongate retainer includes a lower portion conforming generally to the lower tapered portion of the first compartment wall, said outstanding flange being cut away where necessary to facilitate bending for conformance to the lower tapered portion of the first compartment wall.

It is yet another aspect of this invention to provide that the second elongate retainer includes an outstanding flange formed into said upper and lower hooks providing the connection means.

It is still another aspect of this invention to provide that the upper and lower rows of slot means of the first and second compartment walls include end slots receiving associated hook means of the first and second retainers to permit use of the compartment to receive two containers of the same size to be received in end-to-end relation engaged by a retainer at the end of said containers.

It is another aspect of this invention to provide that the upper and lower rows of slot means of the first and second compartment walls include intermediate slots receiving associated hook means of the first and second retainers to permit use of the compartment to receive a contoured container engaged by a retainer intermediate its length.

It is an aspect of this invention to provide that the first retainer includes an intermediate connection to improve stability.

This retainer system is inexpensive to manufacture, the adjustment is simple to effectuate and is very effective for its intended purpose.

DESCRIPTION OF THE PREFERRED EMBODIMENT

Figure 1:
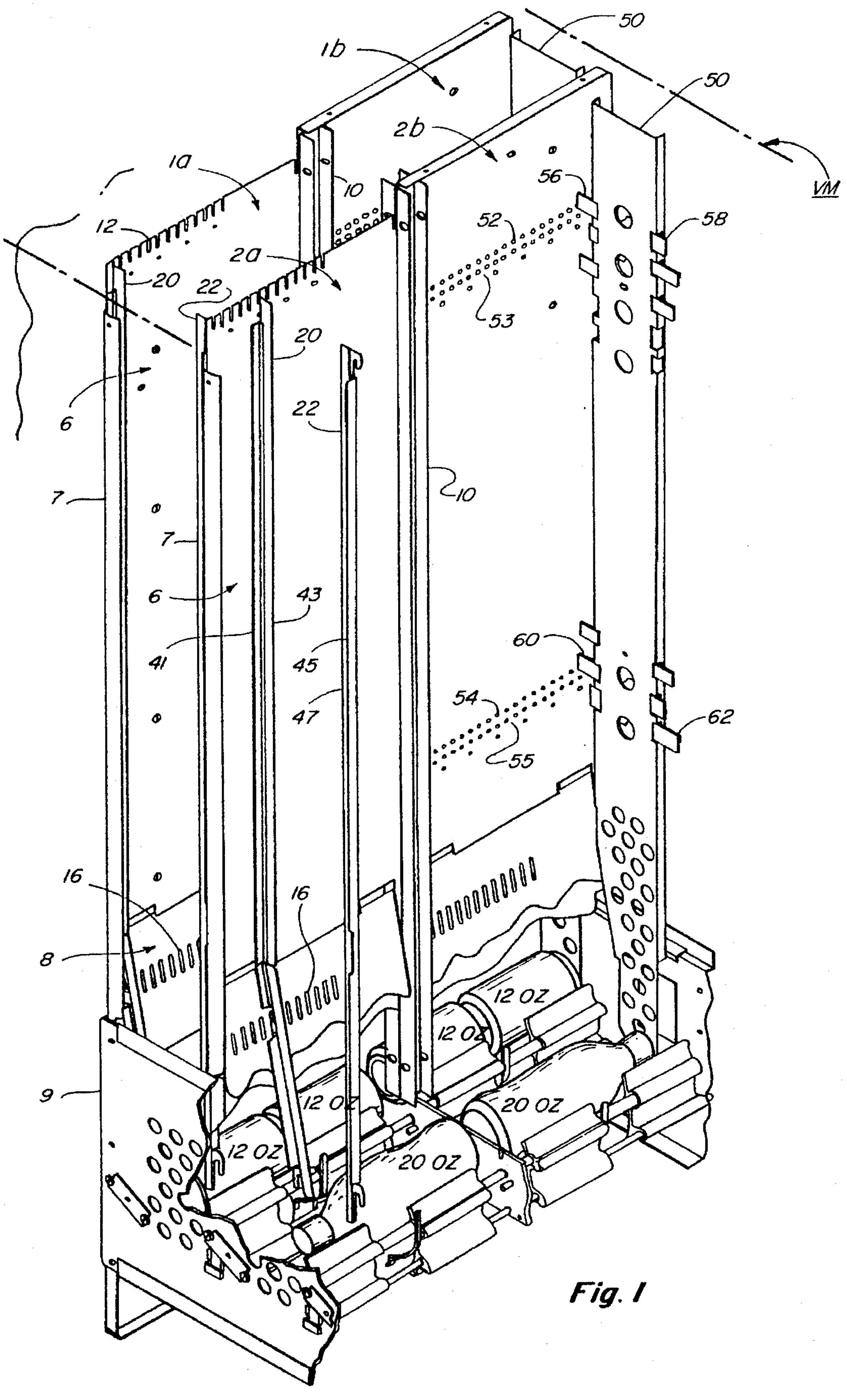
FIG. 1 is an isometric view of a vending machine compartment arrangement employing the retaining system.
Figure 3:
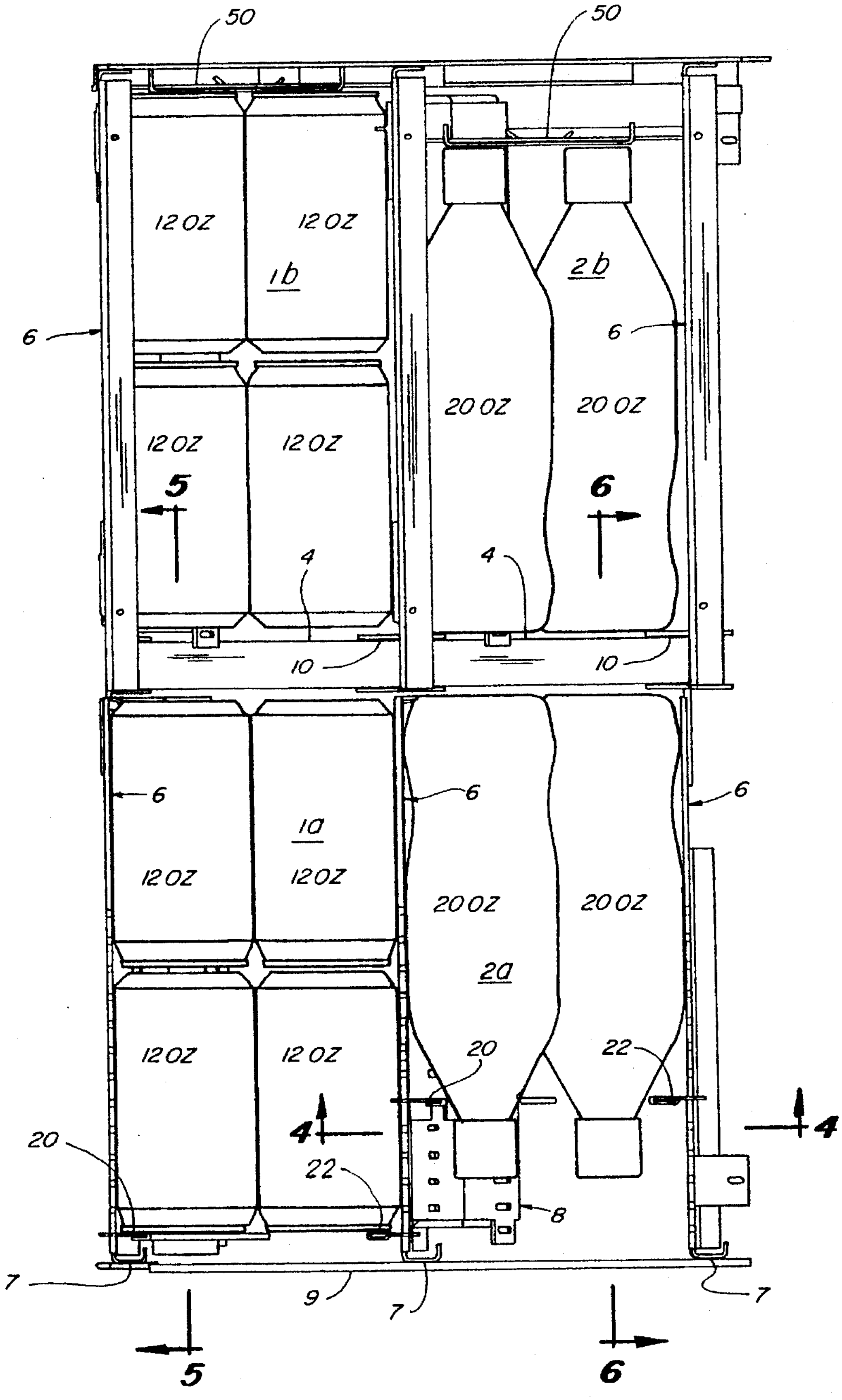
FIG. 3 is an enlarged cross-sectional view taken through front and rear compartments.
Figure 5:
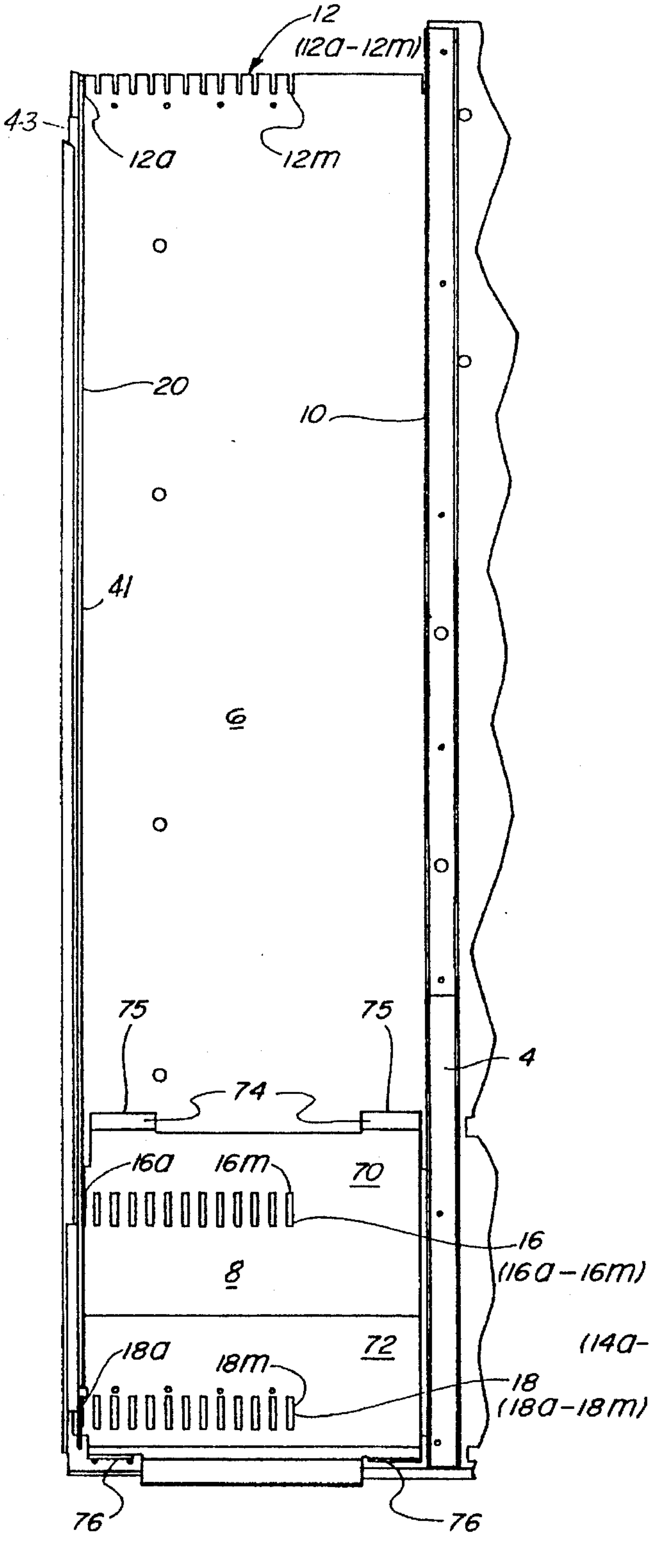
FIG. 5 is a cross-sectional view taken on line 5—5 of FIG. 3.

Referring now by reference numerals to the drawings and first to FIGS. 1 and 3, it will be understood that the front and rear compartments 1*a*, 1*b*; 2*a*, 2*b*, etc. shown are part of a vending machine VM.

Figure 2:
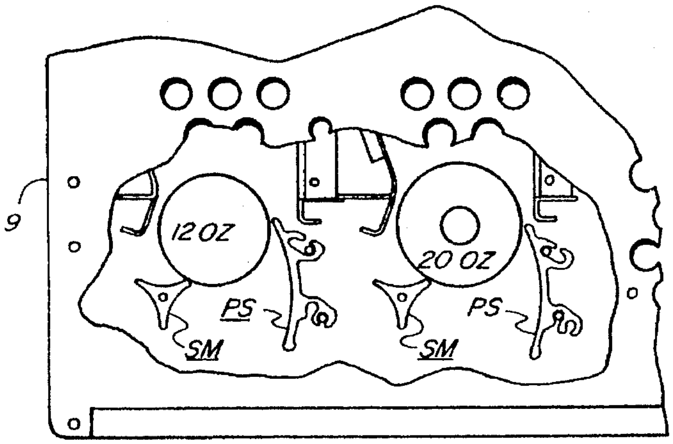
FIG. 2 is an enlarged fragmentary elevational view of the lower end of the compartments.
Figure 4:
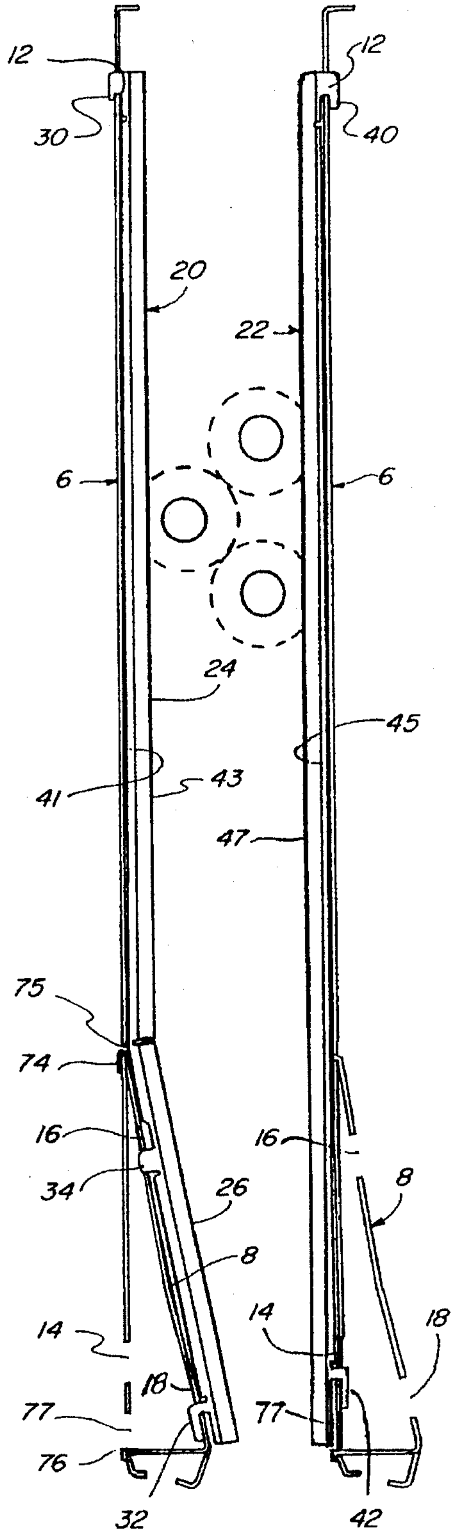
FIG. 4 is a cross-sectional view taken on line 4—4 of FIG. 3.

The compartments 1*a*, 1*b*; 2*a*, 2*b*; etc., are similar in that each is defined by opposed vertical compartment walls 6 having stiffening flanges 7 and connected by a bottom plate 9 and an auxiliary lower inclined compartment wall 8 on one side, which is tapered to direct the containers onto the dispensing mechanism shown in FIG. 2.

The compartments 1*a*, 1*b*; 2*a*, 2*b*; etc., are also similar in that each compartment can be adapted to store and dispense product in the form of vertical columns of staggered standard 12 ounce container cans, or 10, 16, and 20 ounce container bottles, as desired. As shown in FIG. 2 it will be understood that the individual compartments are loaded with the same size product rather than a mix of various sizes of product. The dispensing mechanism by which this is achieved includes product support members SM and adjustable product stops PS which are described in copending U.S. patent application Ser. No. 08/323,363. This patent application is incorporated herein by reference and which may be actuated by reciprocating mechanism such as that shown in U.S. Pat. Nos. 4,991,739 and 4,991,740 which are also incorporated herein by reference.

The storage of the product is facilitated by the provision of adjustable product retainers. These adjustable retainers greatly facilitate access to the front compartments 1*a*, 2*a*, etc. and to the rear compartments 1*a*, 2*a*, etc. The adjustable retainers will now be described first with reference to compartments 1*a* and 1*b* which are shown, by way of example, as being loaded with pairs of end-to-end 12 ounce cans, and second with reference to compartments 2*a* and 2*b*, which are shown, also by way of example, as being loaded with single 20 ounce bottles.

With respect to compartments 1*a* and 1*b*, it will be understood that the depth of the front compartment 1*a* is defined by an intermediate retainer 4 held in place by opposed fixed elongate channels 10 and by elongate retainers 20 and 22 which are adjustably connected to the vertical and inclined compartment walls 6 and 8, respectively. To this end, the compartment walls 6 are provided with upper and lower horizontal rows of vertical slots 12 and 14, respectively, and the auxiliary lower inclined compartment wall 8 is provided with upper and lower horizontal rows of vertical slots 16 and 18, respectively, said slots constituting connection means.

The elongate retainers 20 and 22 include cooperating connection means engageable with the compartment wall slots. As shown in FIG. 3, retainer 20 is generally L-shaped in cross section having a transverse flange 41 and an outstanding flange 43 and includes an upper vertical portion 24 and a lower inclined portion 26 thereby substantially conforming to the configuration of the compartment walls 6 and 8 to which it is connected.

Figure 8:
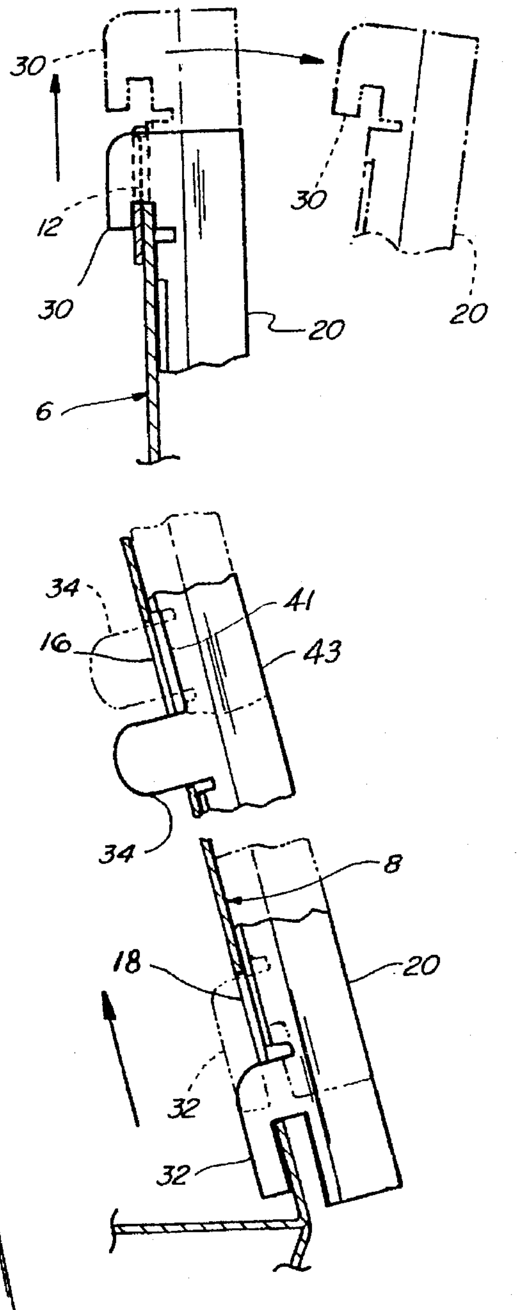
FIG. 8 is an enlarged view of an adjustable retainer.
Figure 7:
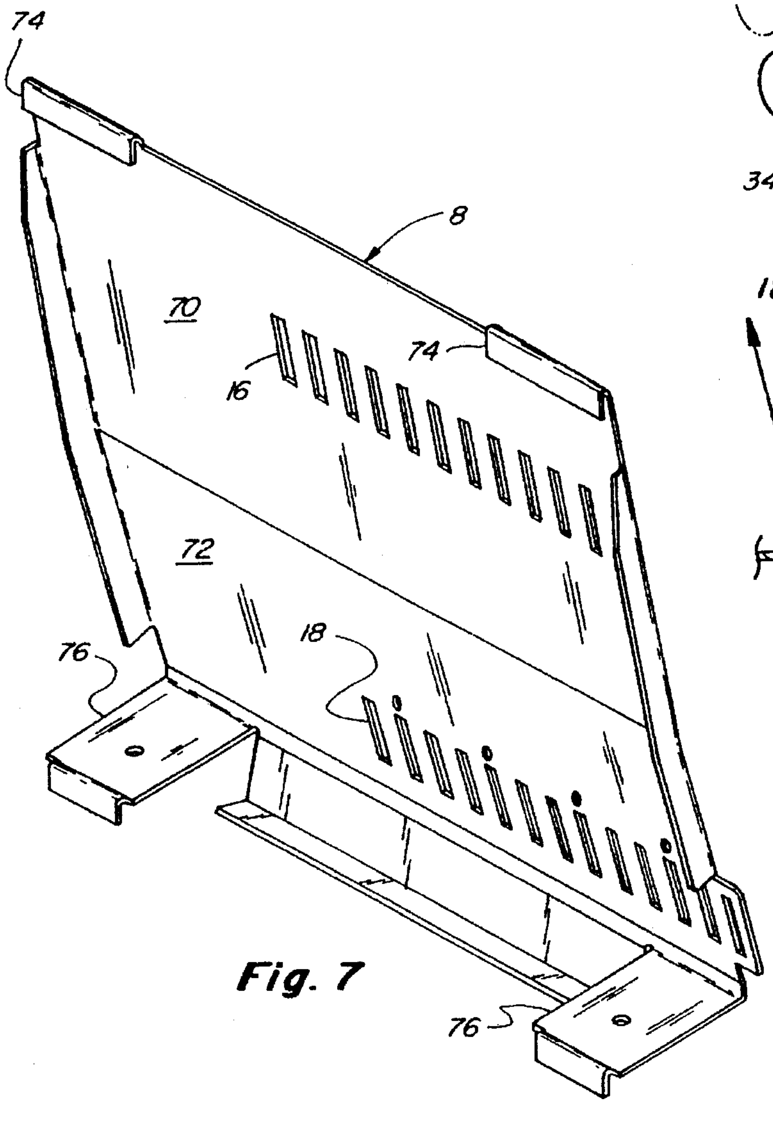
FIG. 7 is an isometric view of the lower compartment wall.

At the upper end and the lower end, the retainer 20 includes hook portions 30 and 32, respectively, which provide spaced connection means received by and removably connecting the retainer 20 to selected slots of the slot rows 12 and 18, namely end slots 12*a* and 18*a*. The retainer 20 in the embodiment shown, also includes an intermediate lug 34 which is received by a selected slot of the slot row 16, namely end slot 16*a*. The transverse flange 41 of the retainer 20 is generally parallel to and engageable with the planar face of the wall 6 and the wall 8 and the hook portions cooperate with the transverse flange 41 to provide a snug fit over the walls 6 and 8 tending to hold the retainer securely in place, yet being readily removable by simply moving the retainer 20 upwardly and outwardly as clearly shown in FIG. 8, pivoting the retainer as necessary about the lower end.

The retainer 22 is similar to retainer 20 being generally L-shaped in cross section having a transverse flange 45 and an outstanding flange 47 but in the embodiment shown is vertical for substantially its full length to substantially conform to the vertical inside face of the compartment wall 6 to which it is connected. At the upper end and the lower end the retainer 22 includes hook portions 40 and 42 which provide spaced connection means received by and removably connecting the retainer 22 to selected slots of the slot rows 12 and 14, namely end slots 12*a* and 14*a*. As with retainer 20, the transverse flange 45 of the retainer 22 is generally parallel to and engageable with the planar face of the wall 6 and the hook portions are a snug fit over the wall to hold the retainer 22 securely in place while permitting ready removal. The outstanding flanges 45 and 47 of the retainers 20 and 22, respectively, engage the ends of the 12 ounce cans to inhibit axial movement thereof.

The rear compartment 1*b* is defined by the intermediate retainer 4 and the rear retainer 50. Unlike the front retainers 20 and 22 the rear retainer 50 extends across the compartment between compartment walls 6 and is adjustably attached to said compartment walls. To this end, the compartment walls 6 include upper and lower horizontal rows 52 and 53 and 54 and 55 of openings which receive the reduced size ends of offset lugs 56 and 58, and offset lugs 60 and 62. Lugs 56 and 60 are received within the lower rows of openings 53 and 55. The lugs 56, 58, 60 and 62 are spring-loaded to hold the rear retainer 50 in place. When maximum depth is required for the end-to-end pairs of 12 ounce cans, shown in compartment 1*b*, the retainer 50 is held in place by utilizing end openings of associated rows 52, 53; and 54, 55.

As noted above, compartments 2*a* and 2*b*, which are arranged to hold single containers, are substantially the same as compartments 1*a* and 2*a* except for the depthwise positioning of the front retainers 20 and 22 and the rear retainer 50.

Figure 6:
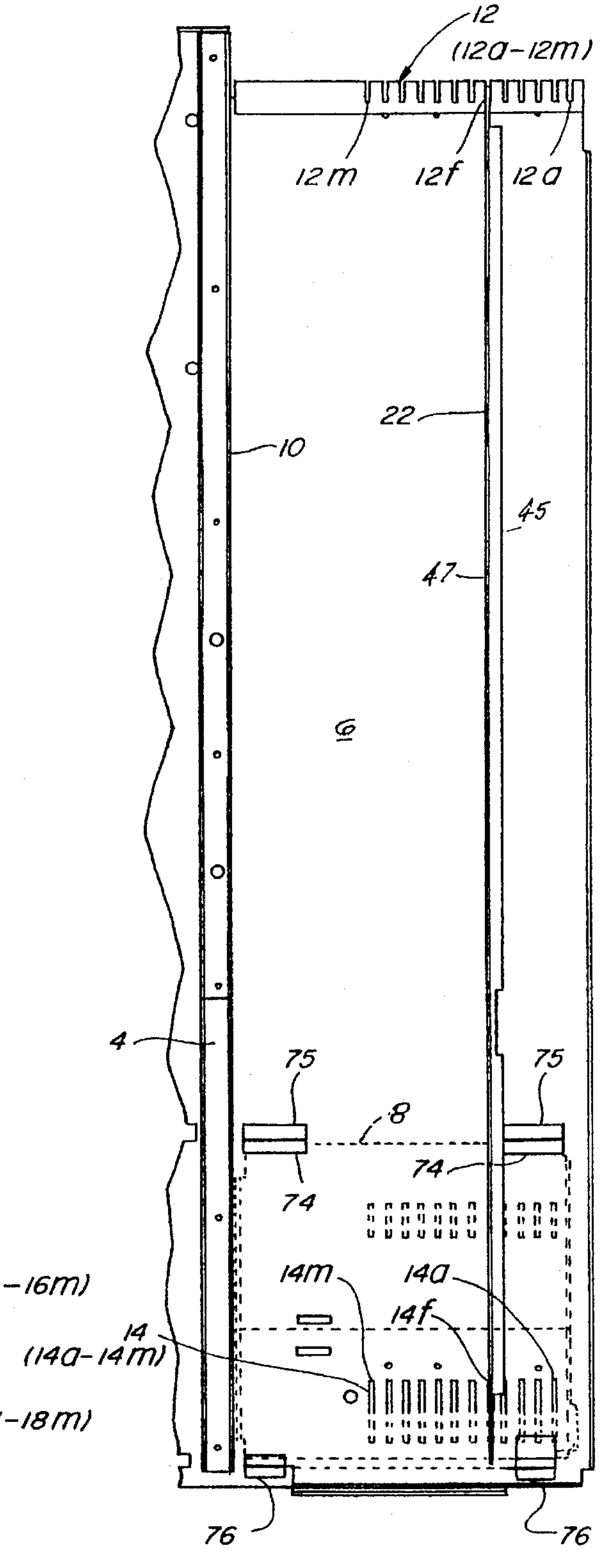
FIG. 6 is a cross-sectional view taken on line 6—6 of FIG. 3.

In the case of the front compartment 2*a* the outstanding flanges 45 of retainers 20 and the outstanding flanges 47 of retainer 22 are positioned to engage reduced, contoured portions of the bottles such as the shoulder portions to inhibit axial movement thereof. This is simply a matter of positioning the retainer 20 hook portions 30 and 32 and the intermediate lug 34 in appropriate slots, for example slots 12*f*, 18*f* and 16*f*, as shown in FIG. 3. Similarly, the retainer 22 hook portions 40 and 42 are position in appropriate slots, for example slots 12*f* and 14*f*, as shown in FIG. 6. In the case of the rear compartment 2*b*, the retainer 50 is positioned to engage the cap of the bottles. This is again simply a matter of positioning the retainer lug portions 56, 58; and 60, 62 in appropriate intermediate openings of associated rows 52, 53 and 54, 55.

It can be seen from the above description that in order to accommodate a desired size of container it is simply a matter of adjusting the front and rear retainers. In particular, because the front retainers 20 and 22 maximize the entry width of the hand and arm of the operator the loading of the front and rear compartments with product is very much facilitated.

The above arrangement provides front retainers 20 and 22 which engage the ends of the cans where maximum depth of compartments is required or engage the shoulders of a selected bottle, where less than maximum depth is required.

In the embodiment shown, the lower inclined compartment wall 8 is narrower than the maximum depth of the compartments, and may be sized so that the same compartment wall 8 can be used for both front and rear compartments for convenience. As shown, the compartment wall 8 includes doubly inclined planar wall portions 70 and 72 to provide the desired wall taper and upper and lower hook portions 74 and 76 which are adapted to be received and held within associated slots 75 and 77 provided in the wall 6.

It will be particularly noted that the outstanding flanges 43 and 47 of the adjustable retainers 20 and 22 are relatively narrow and yet are sufficient to perform the retaining function, inhibiting axial movement for both cans and contoured bottles. Because of this arrangement, and unlike the prior art arrangements, there is a relatively wide clear opening available to load the front compartment directly from the front end. In the embodiment shown, the access width available for the hand and arm of the loader is close to 4 inches which is sufficiently great to facilitate front end loading.

Although the invention has been described by making detailed reference to the preferred embodiments, such detail is to be understood in an instructive rather than in any restrictive sense, many other variants being possible within the scope of the claims hereunto appended.

We claim as our invention:

1. A retainer system for vending machine storage compartment for containers having a longitudinal axis and variable length and diameter, the compartment comprising:

(a) a first compartment wall having connection means;

(b) a second compartment wall oppositely disposed of said first compartment wall and having connection means;

(c) a first elongate retainer having connection means engagable with the connection means of the first compartment wall for removably connecting the first retainer to the first compartment wall in selectively adjustable relation lengthwise of the container; and (d) a second elongate retainer having connection means engagable with the connection means of the second compartment wall for removably connection the second retainer to the second compartment wall in selectively adjustable relation lengthwise of the container;

(e) the container being engageable by the retainers, said retainers providing a stop to inhibit axial movement and the access width between the retainers being sufficiently great to facilitate loading.

2. A compartment as defined in claim 1, in which:

(f) the first compartment wall connection means includes upper and lower rows of slot means;

(g) the second compartment wall connection means includes upper and lower rows of slots means;

(h) the first elongate retainer connection means includes upper and lower hook means selectively engageable with associated upper and lower slot means; and (i) the second elongate retainer connection means includes upper and lower hook means selectively engageable with associated upper and lower slot means.

3. A compartment as defined in claim 1, in which:

(f) the first compartment wall includes a lower tapered portion; and (g) the first elongate retainer includes a lower portion conforming generally to the lower tapered portion of the first compartment wall.

4. A compartment as defined in claim 1, in which:

(f) the second compartment wall is generally vertical; and (g) the second elongate retainer is generally vertical.

5. A compartment as defined in claim 2, in which:

(h) the first elongate retainer includes an outstanding flange formed into upper and lower hooks providing the connection means.

6. A compartment as defined in claim 2, in which:

(j) the upper and lower rows of slot means of the first and second compartment walls include intermediate slots receiving associated hook means of the first and second retainers to permit use of the compartment to receive a contoured container engaged by a retainer intermediate its length.

7. A compartment as defined in claim 5, in which:

(i) the first retainer includes an intermediate connection to improve stability.

8. A compartment as defined in claim 1, in which:

(f) only one adjustable retainer is provided on each opposed compartment wall to provide the stop.

9. A compartment as defined in claim 1, in which:

(f) the retainers on each compartment wall are generally ell-shaped having an outstanding flange engagable with the container.

10. A compartment as defined in claim 1, in which:

(f) the compartment are adapted to selectively receive double depth end-to-end cans or single depth contoured bottles, the containers being engagable by the retainers at one end of an outermost can when cans are stored and the containers being engagable by the retainers intermediate their ends when contoured bottles are stored.

11. A compartment as defined in claim 1, in which:

(f) the containers are contoured bottles having a cap end, a bottom end and a retainer-engagable shoulder adjacent the cap end, and (g) the compartment access is closer to the cap end and the shoulder to facilitate loading.

12. A retainer system for a vending machine storage compartment for containers having a longitudinal axis and variable length and diameter, the compartment comprising:

(a) a first compartment wall having connection means;

(b) a second compartment wall oppositely disposed of said first compartment wall and having connection means;

(c) a first elongate retainer having connection means engageable with the connection means of the first compartment wall for removably connecting the first retainer to the first compartment wall in selectively adjustable relation lengthwise of the container; and (d) a second elongate retainer having connection means engageable with the connection means of the second compartment wall for removably connecting the second retainer to the second compartment wall in selectively adjustable relation lengthwise of the container;

(e) the containers being engageable by the retainers to inhibit axial movement and the access width between the retainers being sufficiently great to facilitate loading;

(f) the first compartment wall connection means including upper and lower rows of slot means;

(g) the second compartment wall connection means including upper and lower rows of slots means;

(h) the first elongate retainer including an outstanding flange formed into upper and lower hooks providing the connection means;

(i) the first compartment wall including a lower tapered portion, and (j) the first elongate retainer including a lower portion conforming generally to the lower tapered portion of the first compartment wall, said outstanding flange being cut away where necessary to facilitate bending for conformance to the lower tapered portion of the first compartment wall.

13. A retainer system for a vending machine storage compartment for containers having a longitudinal axis and variable length and diameter, the compartment comprising;

(a) a first compartment wall having connection means;

(b) a second compartment wall oppositely disposed of said first compartment wall and having connection means;

(c) a first elongate retainer having connection means engagable with the connection means of the first compartment wall for removably connection the first retainer to the first compartment wall in selectively adjustable relation lengthwise of the container; and (d) a second elongate retainer having connection means engagable with the connection means of the second compartment wall for removably connecting the second retainer to the second compartment wall in selectively adjustable relation lengthwise of the container;

(e) the containers being engagable by the retainers to inhibit axial movement and the access width between the retainers being sufficiently great to facilitate loading;

(f) the first compartment wall connection means including upper and lower rows of slot means;

(g) the second compartment wall connection means including upper and lower rows of slots means; and (j) the second elongate retainer including an outstanding flange formed into said upper and lower hooks providing the connection means.

14. A retainer system for a vending machine storage compartment for containers having a longitudinal axis and variable length and diameter, the compartment comprising:

(a) a first compartment wall having connection means;

(b) a second compartment wall oppositely disposed of said first compartment wall and having connection means;

(c) a first elongate retainer having connection means engageable with the connection means of the first compartment wall for removably connecting the first retainer to the first compartment wall in selectively adjustable relation lengthwise of the container; and (d) a second elongate retainer having connection means engageable with the connection means of the second compartment wall for removably connecting the second retainer to the second compartment wall in selectively adjustable relation lengthwise of the container;

(e) the containers being engageable by the retainers to inhibit axial movement and the access width between the retainers being sufficiently great to facilitate loading;

(f) the first compartment wall connection means including upper and lower rows of slot means;

(g) the second compartment wall connection means including upper and lower rows of slots means; and (j) the upper and lower rows of slot means of the first and second compartment walls including end slots receiving associated hook means of the first and second retainers to permit use of the compartment to receive two containers of the same size to be received in end-to-end relation engaged by a retainer at the end of said containers.

* * * * *